(12) United States Patent
Sato (10) Patent No.: US 8,922,509 B2
(45) Date of Patent: Dec. 30, 2014

(54) OPERATION OF AN ELECTRONIC DEVICE WITH MULTIPLE DISPLAY SCREENS

(75) Inventor: Takuya Sato, Daito (JP)

(73) Assignee: KYOCERA Corporation, Kyoto (JP)

( * ) Notice: Subject to any disclaimer, the term of this patent is extended or adjusted under 35 U.S.C. 154(b) by 92 days.

(21) Appl. No.: 13/428,222

(22) Filed: Mar. 23, 2012

(65) Prior Publication Data

US 2012/0242605 A1  Sep. 27, 2012

(30) Foreign Application Priority Data

Mar. 25, 2011 (JP) ................................. 2011-068301

(51) Int. Cl.
  *G06F 3/041* (2006.01)
  *G06F 1/16* (2006.01)
  *G06F 3/0488* (2013.01)

(52) U.S. Cl.
  CPC ............ *G06F 1/1616* (2013.01); *G06F 3/0416* (2013.01); *G06F 1/1692* (2013.01); *G06F 3/04883* (2013.01)
  USPC ........................................... 345/173; 345/1.1

(58) Field of Classification Search
  USPC .................. 345/173, 174, 1.1–1.3; 178/18.01–18.06
  See application file for complete search history.

(56) References Cited

U.S. PATENT DOCUMENTS

| 6,545,669 | B1 * | 4/2003 | Kinawi et al. | 345/173 |
| 2010/0229089 | A1 * | 9/2010 | Narita | 715/702 |
| 2010/0295802 | A1 * | 11/2010 | Lee | 345/173 |
| 2010/0298033 | A1 * | 11/2010 | Lee | 455/566 |
| 2011/0018821 | A1 * | 1/2011 | Kii | 345/173 |
| 2011/0050599 | A1 * | 3/2011 | Sip | 345/173 |

FOREIGN PATENT DOCUMENTS

JP   2008-217647 A   9/2008

* cited by examiner

*Primary Examiner* — Pegeman Karimi
(74) *Attorney, Agent, or Firm* — Procopio, Cory, Hargreaves & Savitch LLP (57) ABSTRACT

An electronic device according to the present invention includes: display screens capable of displaying information thereon; touch panels which are provided on these display screens and are adapted to be manipulated by a user; touch-panel determination portions which are electrically connected to the touch panels and are adapted to receive coordinate information from the touch panels due to user's manipulations thereof; and a controller which is electrically connected to the display screens and to the touch-panel determination portions, and is adapted to cause the display screens to display information thereon and to receive signals inputted thereto from the touch-panel determination portions, wherein the controller includes a displayer, which is adapted to cause the display screens to display information thereon, and when the touch-panel determination portions receive coordinate information, to display information about a peripheral area including the coordinates thereon, at a position different from that of these coordinates.

6 Claims, 8 Drawing Sheets

OPERATION OF AN ELECTRONIC DEVICE WITH MULTIPLE DISPLAY SCREENS

CROSS-REFERENCES TO RELATED APPLICATIONS

This application claims priority to Japanese Patent Application No. 2011-68301 filed on Mar. 25, 2011, which is hereby incorporated by reference.

BACKGROUND OF THE INVENTION

1. Field of the Invention

The present invention relates to an electronic device including a plurality of display screens and touch panels on the respective display screens.

2. Description of the Related Art

There have been known electronic devices including a plurality of display screens and touch-panel type manipulators provided on the respective display screens.

As touch panels, there have been known resistive-type touch panels and capacitive-type touch panels. Users can view characters and images displayed on the display screens, as well as perform manipulating, editing, and the like through tapping, double tapping, flicking, dragging, and the like on such touch panels.

Such an electronic device incorporates an operating system (so-called basic software) which serves as a platform for operating various types of applications. Activation, completion, and minimization of the applications, adjustment of sound volume and the like can be performed by manipulation of the operating system.

When an application is being activated, and the application is being displayed on the display screens, the touch panels are occupied by the application, which makes it impossible to perform manipulations of the operating system through the touch panels. Accordingly, in order to perform manipulations of the operating system during activation of an application, there have been additionally provided manipulation buttons such as a home button and a sound volume button for the operating system, such that the operating system can be manipulated through these manipulation buttons.

Accordingly, there has been a need for electronic devices with improved maneuverability which enable manipulations of on an operating system through touch panels during activation of an application and the like.

SUMMARY OF THE INVENTION

An electronic device according to an aspect of the present invention includes:

a plurality of display screens capable of displaying information thereon;

touch panels which are provided on the respective display screens and are adapted to be manipulated by a user;

touch-panel determination portions which are electrically connected to the respective touch panels and are adapted to detect a user's manipulation of the touch panels;

an operating-system control portion adapted to operate an operating system; and an executor which is electrically connected to the touch-panel determination portions and the operating-system control portion and is adapted to, upon the user's manipulation of the touch panels being detected from both of at least two of the touch-panel determination portions, cause the operating-system control portion to execute a process in the operating system corresponding to the manipulation.

DETAILED DESCRIPTION OF THE PREFERRED EMBODIMENT

The present invention can be applied to an electronic device 10 that includes a plurality of display screens 21 and 31, on at least two of which touch panels 22 and 32 are provided. The electronic device 10 is adapted to activate an operating system which serves as a platform, and to activate one or more applications through the operating system. Under such circumstances in the electronic device 10, when information such as characters, graphics, images, pictures and moving images is displayed on the display screens 21 and 31, a user can perform editing and the like on such information by manipulating the touch panel 22 and/or the touch panel 32.

Hereinafter, there will be described an electronic device 10 according to an embodiment of the present invention, by exemplifying a portable-type electronic device, with reference to the drawings. However, the configuration and the structure of the electronic device which will be described in detail later are merely for illustrative purposes, and the present invention should not be restrictively understood, as a matter of course.

At first, there will be described the configuration of the portable-type electronic device 10 according to the present embodiment.

Figure 1:
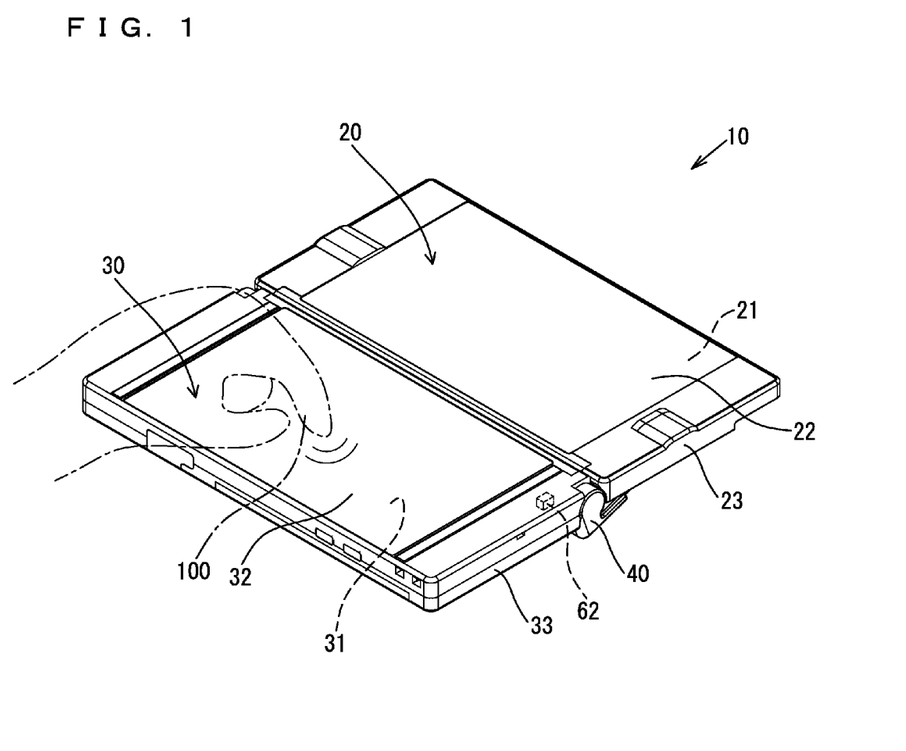
FIG. 1 is a perspective view illustrating an example of an electronic device according to an embodiment of the present invention.

The electronic device 10 includes display portions 20 and 30, as illustrated in FIG. 1. The display portions 20 and 30 include two display screens 21 and 31 capable of displaying thereon, information such as characters, graphics, images, pictures, and moving images, in association with applications desired by a user. The display portions 20 and 30 include touch panels 22 and 32 that the user can manipulate by touching the surfaces of the display screens. The display portions 20 and 30 are coupled to each other through a coupling mechanism 40, such that they can be moved with respect to each other by opening and closing, sliding and the like. Note that the number of the display portions 20 and 30 is not limited to two, provided that it is more than one.

The first display portion 20 and the second display portion 30 are housed within casings 23 and 33 which are opened at their respective surfaces in one side, such that the display screens 21 and 31 capable of displaying information thereon can be viewed from the opened sides, as illustrated in FIG. 1. The display screens 21 and 31 are electrically connected to a controller 60 (see FIG. 2), which will be described later, and can display various types of information thereon. Further, referring to FIG. 1, the display portion positioned in the right back side in the paper plane is referred to as the first display portion 20, while the display portion positioned in the left front side is referred to as the second display portion 30.

The display screens 21 and 31 are constituted by liquid crystal displays, for example. The display portions 20 and 30 include the touch panels 22 and 32 that the user can manipulate by touching them with a finger tip 100 or the like, on the respective opening-sides of the display screens 21 and 31, as illustrated in FIG. 1. The touch panels 22 and 32 are made transparent in order to enable the display screens 21 and 31 to be viewed therethrough and are provided in such a way as to close the openings of the casings 23 and 33. As a type of the touch panels 22 and 32, it is possible to exemplify a capacitive-type or a resistive-type.

The first display portion 20 and the second display portion 30 can be made movable with respect to each other through the coupling mechanism 40. Although the structure thereof is not described in detail, this structure is a structure in which the first display portion 20 is made slidable and/or rotatable with respect to the second display portion 30, for example.

Further, the electronic device 10 includes an inclination detection sensor 62 such as an acceleration sensor, at an appropriate portion thereof, as illustrated in FIG. 1. The inclination detection sensor 62 is capable of detecting the orientation of the electronic device 10 with respect to a vertical line, namely the orientation whether the electronic device 10 is in a longitudinal orientation in which the second display portion 30 longitudinally aligns with the first display portion 20 or in a lateral orientation in which they laterally align with each other, and the like.

Figure 2:
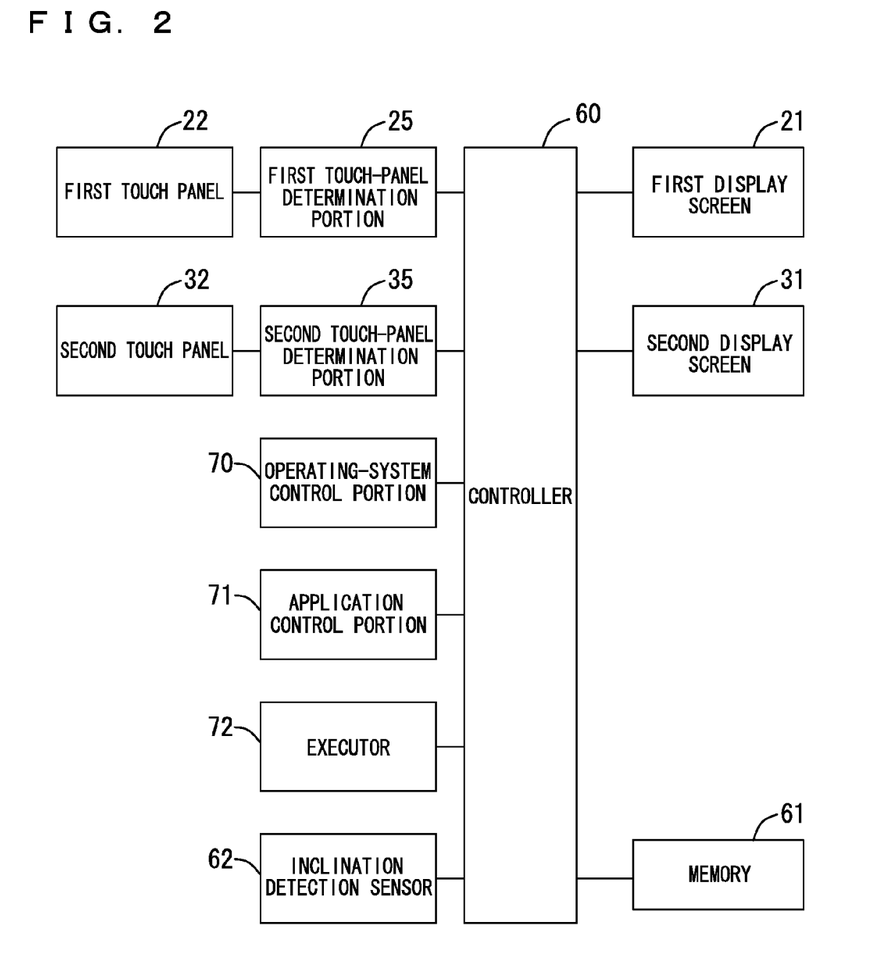
FIG. 2 is a block diagram of the electronic device according to an embodiment of the present invention.

FIG. 2 illustrates an exemplary block diagram of the electronic device according to an embodiment of the present invention.

The electronic device is overall controlled by the controller 60 constituted by a CPU or the like, as illustrated in FIG. 2.

The first touch panel 22 and the second touch panel 32 are electrically connected to the controller 60 through a first touch-panel determination portion 25 and a second touch-panel determination portion 35, respectively. Thus, user's inputs to the first touch panel 22 and the second touch panel 32 are transmitted, as coordinate information, to the controller 60 through the respective touch-panel determination portions 25 and 35. The controller 60 performs editing, manipulating and the like, on information on the display screens 21 and 31, according to these inputs.

The first display screen 21 and the second display screen 31 are further electrically connected to the controller 60. Thus, the first display screen 21 and the second display screen 31 are enabled to display various types of information according to an operating system and application software used therein.

The operating system incorporated in the electronic device 10 is operated by an operating-system control portion 70 which is electrically connected to the controller 60. The operating system is a system that serves as an interface for applications and is adapted to perform activation (opening) and completion (closing) of applications, adjustment of the sound volume, displaying of the time of day, alarm setting, and other system operations. Hereinafter, a basic screen for the operating system will be referred to as "home".

Further, such various types of applications which are activated in the electronic device 10 are operated by an application control portion 71 which is electrically connected to the controller 60, through the operating system. As such applications, it is possible to exemplify mail software, a browser, game software, and viewer software.

Further, the touch-panel determination portions 25 and 35, and the operating-system control portion 70 are electrically connected to an executor 72, through the controller 60. The controller 60, the operating-system control portion 70, the application control portion 71 and the executor 72 may be constituted by one or more CPUs.

The executor 72 monitors the touch-panel determination portions 25 and 35. Further, if user's manipulations of both the touch panels 22 and 32 are detected from the touch-panel determination portions 25 and 35, the executor 72 causes the operating-system control portion 70 to execute a process of the operating system which corresponds to these manipulations. Note that a flow of operations of the executor 72 will be described in detail later with reference to a flow chart in FIG. 3, and the like.

In addition thereto, the inclination detection sensor 62, a memory 61 for storing various types of operations of the operating system, the applications, and the electronic device 10 and also for storing various types of data desired by the user, and the like, are electrically connected to the controller 60.

The electronic device 10 having the above structure generally performs operations as follows. The electronic device 10 causes the operating-system control portion 70 to operate the operating system, causes the application control portion 71 to activate one or more applications according to user's demands, and causes the first display screen 21 and/or the second display screen 31 to display information about the operating system and the applications thereon.

Further, user's manipulations through the touch panels 22 and 32 are inputted to the controller 60 through the touch-panel determination portions 25 and 35, and the inputted manipulations are processed by the operating-system control portion 70 or the application control portion 71.

In the present embodiment, if the user manipulates both the first touch panel 22 and the second touch panel 32 at the same time or if the user manipulates one of the touch panels while manipulating the other one, the executor 72 executes a process relating to the operating system, according to the presence or absence of an activated application.

Figure 3:
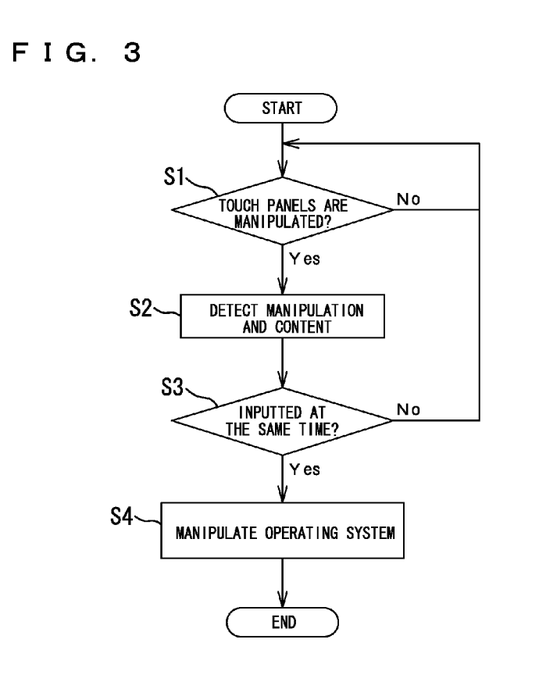
FIG. 3 is a flow chart diagram illustrating an example of operations according to an embodiment of the present invention.

The flow chart in FIG. 3 illustrates a flow of operations in the executor 72.

In the state where one or more applications are being activated or no application is being activated, the user manipulates the touch panels 22 and 32 (Yes in step 1).

The touch-panel determination portions 25 and 35 detect the manipulations of the respective touch panels 22 and 32 (step 2), and transmit signals indicative of the detection to the controller 60.

If it is determined that the user manipulates the touch panels 22 and 32 at the same time or that the user manipulates one of the touch panels while manipulating the other one, namely if it is determined that the signals transmitted from the touch-panel determination portions 25 and 35 to the controller 60 are inputted at the same time (Yes in step 3), the executor 72 transmits operating-system manipulation signals corresponding to these manipulations, to the operating-system control portion 70, according to the number of the applications being activated (see Table 1 below), thereby causing the operating system to be manipulated (step 4).

As manipulations which can be performed on both the touch panels 22 and 32, it is possible to exemplify tapping and double tapping which are touching the touch panels 22 and 32 for a relatively short time period, so-called dragging which is a manipulation for moving a touch point while keeping touching the touch panels 22 and 32 for a longer time period than those of the tapping and double tapping, so-called flicking which is a manipulation for touching the touch panels 22 and 32 with a finger, a stylus, or the like, and then rapidly sweeping a finger, so-called pinching which is a manipulation for keeping touching the touch panels 22 and 32 with two fingers and the like, and changing the distance therebetween, so-called long touching which is long pushing the touch panels 22 and 32 at the same position thereon, and combinations of these manipulations (see Table 1, and FIGS. 4 to 13). More specifically, for example, it is possible to exemplify manipulations for performing tapping, double tapping, flicking, dragging and the like on one of the touch panels while performing long tapping on the other touch panel. Further, it is also possible to exemplify manipulations for performing flicking and dragging on both the touch panels.

Further, as operations performed by the operating system upon manipulations of both the touch panels 22 and 32, it is possible to exemplify closing of applications, returning to the home, and adjustment of the sound volume, etc.

Table 1 represents user's manipulations of the touch panels 22 and 32, and the corresponding operations of the operating system, as specific embodiments. Further, FIGS. 4 to 13 illustrate user's manipulations of the touch panels 22 and 32.

TABLE 1

Figure 4:
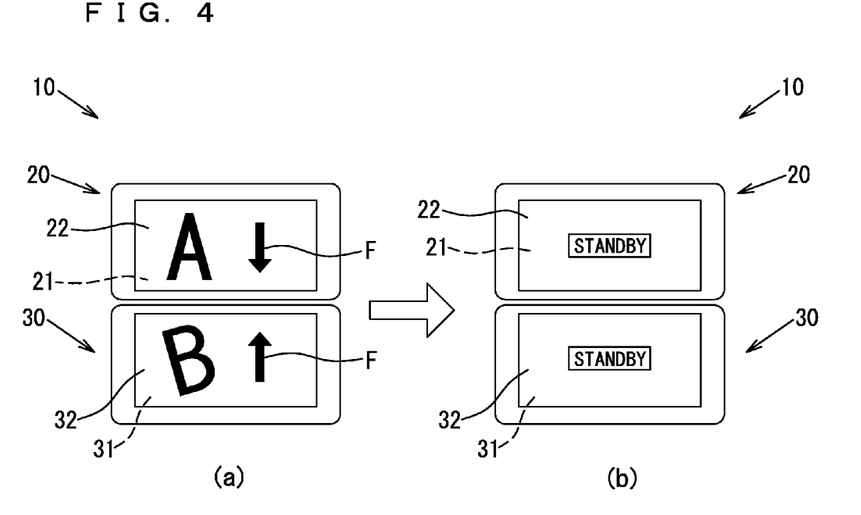
FIG. 4A is an explanation view illustrating a manipulation of the electronic device according to an embodiment of the present invention.
FIG. 4B is an explanation view illustrating an example of an operation corresponding thereto.
Figure 5:
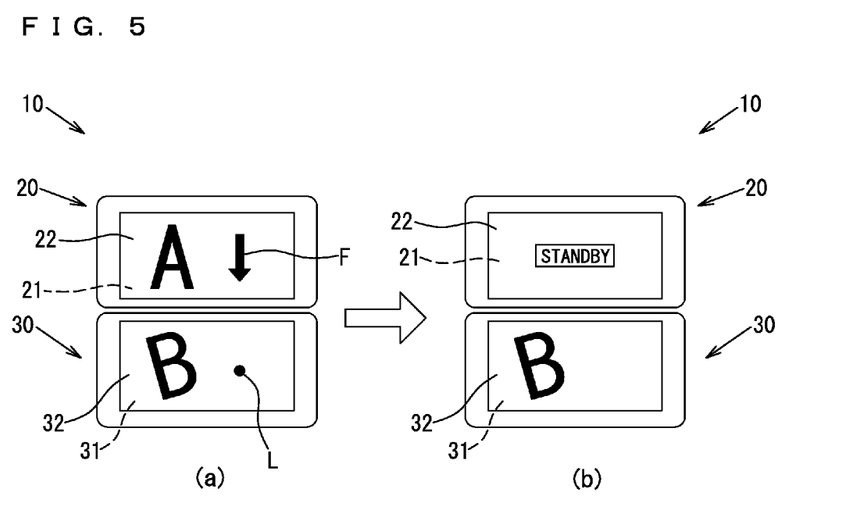
FIG. 5A is an explanation view illustrating a manipulation of the electronic device according to an embodiment of the present invention.
FIG. 5B is an explanation view illustrating an example of an operation corresponding thereto.
Figure 6:
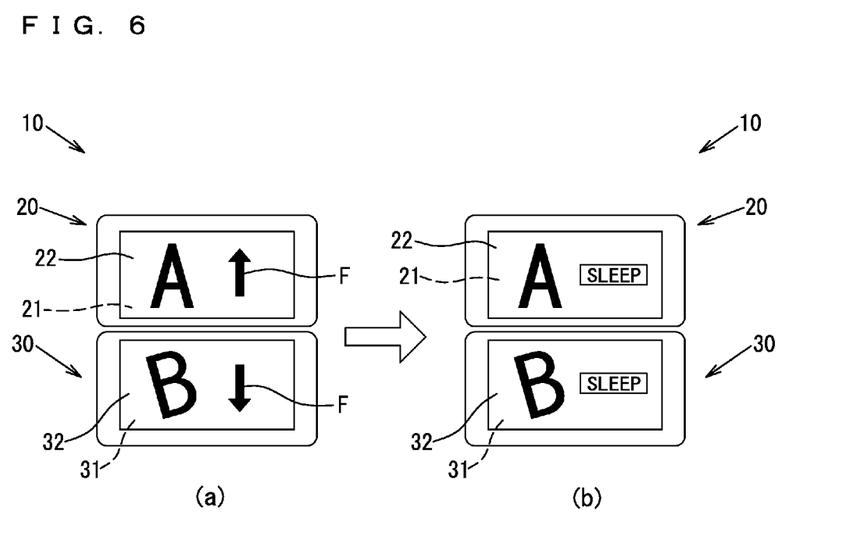
FIG. 6A is an explanation view illustrating a manipulation of the electronic device according to an embodiment of the present invention.
FIG. 6B is an explanation view illustrating an example of an operation corresponding thereto.
Figure 7:
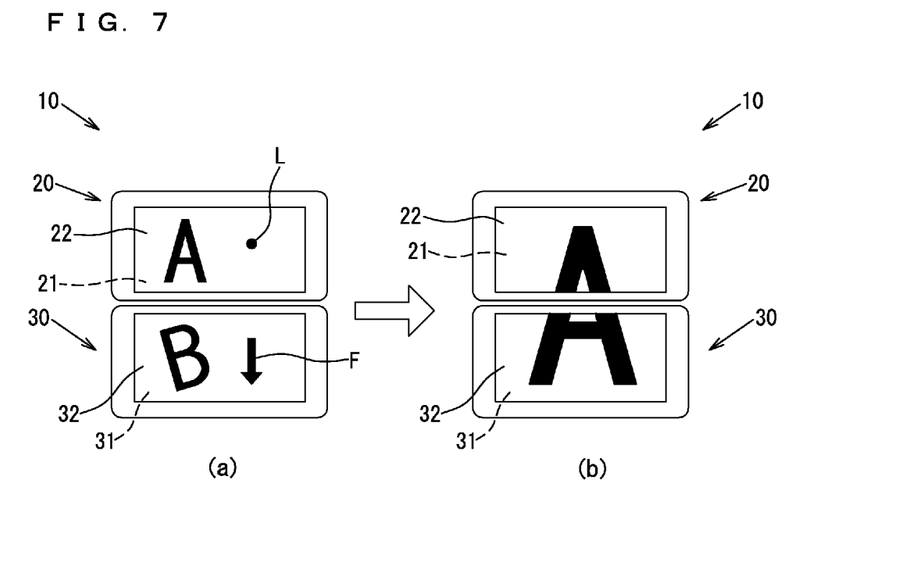
FIG. 7A is an explanation view illustrating a manipulation of the electronic device according to an embodiment of the present invention.
FIG. 7B is an explanation view illustrating an example of an operation corresponding thereto.
Figure 8:
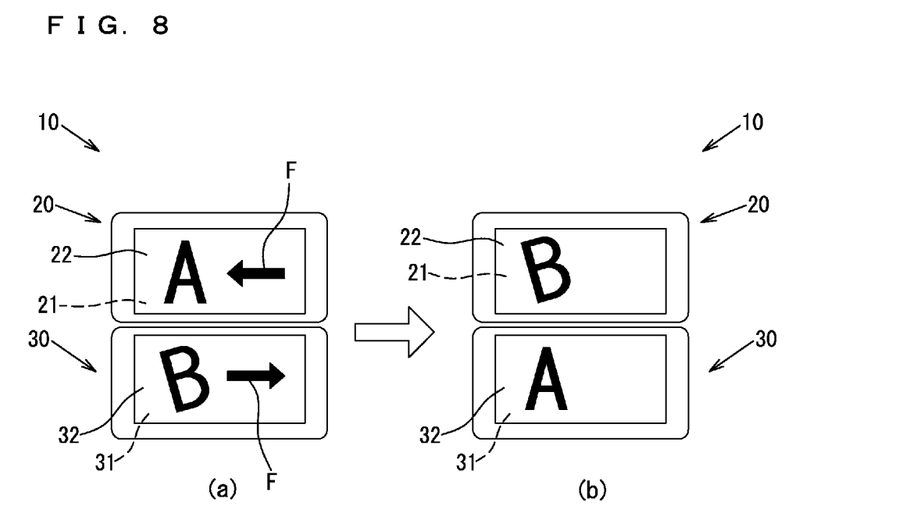
FIG. 8A is an explanation view illustrating a manipulation of the electronic device according to an embodiment of the present invention.
FIG. 8B is an explanation view illustrating an example of an operation corresponding thereto.
Figure 9:
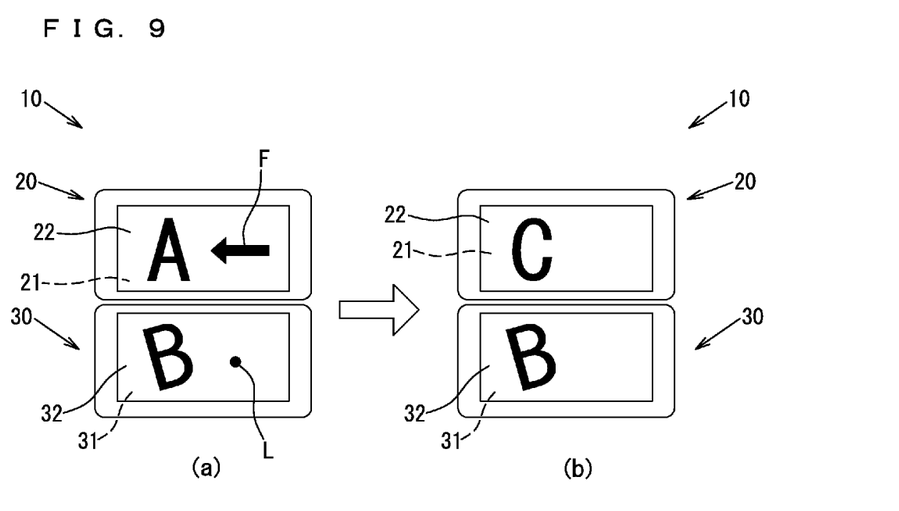
FIG. 9A is an explanation view illustrating a manipulation of the electronic device according to an embodiment of the present invention.
FIG. 9B is an explanation view illustrating an example of an operation corresponding thereto.
Figure 10:
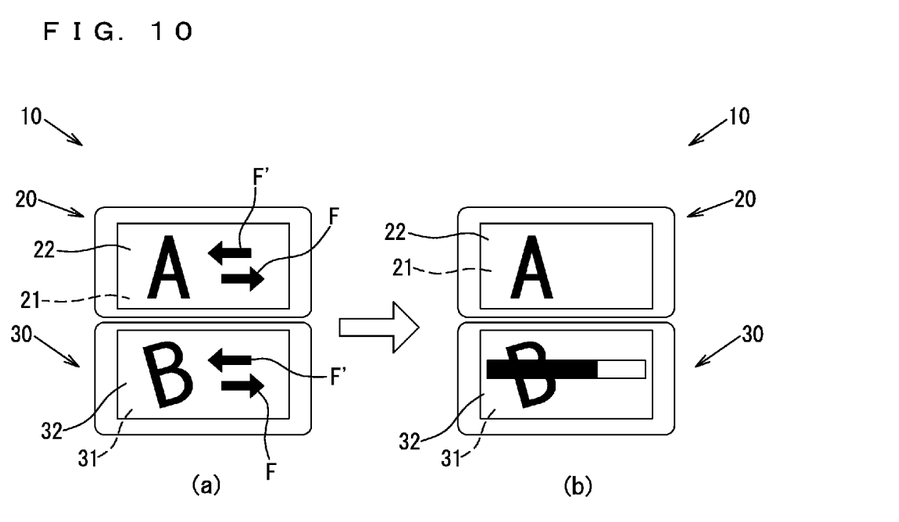
FIG. 10A is an explanation view illustrating a manipulation of the electronic device according to an embodiment of the present invention.
FIG. 10B is an explanation view illustrating an example of an operation corresponding thereto.
Figure 11:
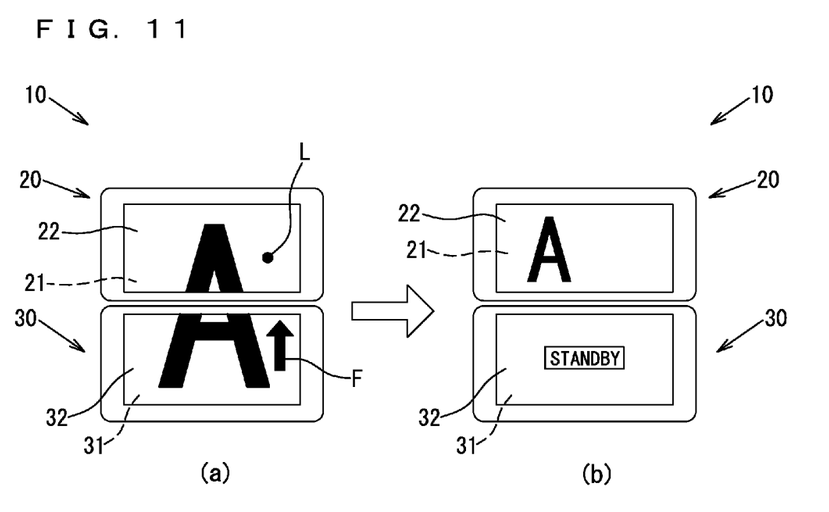
FIG. 11A is an explanation view illustrating a manipulation of the electronic device according to an embodiment of the present invention.
FIG. 11B is an explanation view illustrating an example of an operation corresponding thereto.
Figure 12:
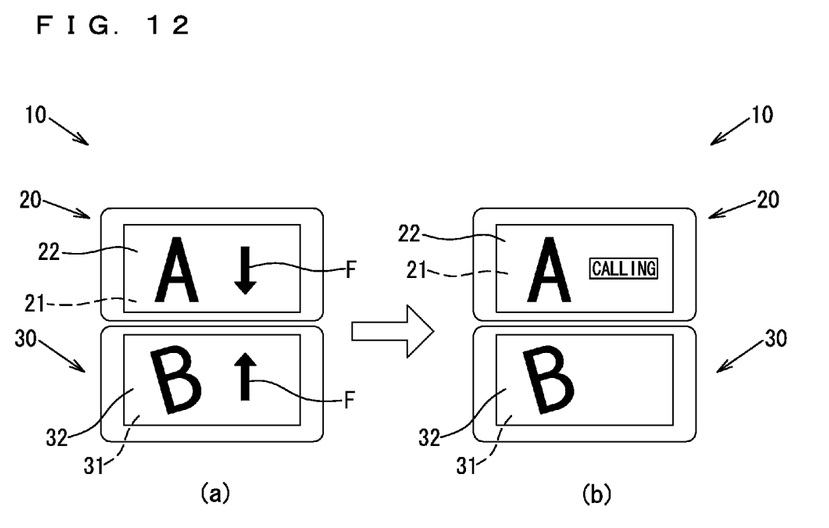
FIG. 12A is an explanation view illustrating a manipulation of the electronic device according to an embodiment of the present invention.
FIG. 12B is an explanation view illustrating an example of an operation corresponding thereto.
Figure 13:
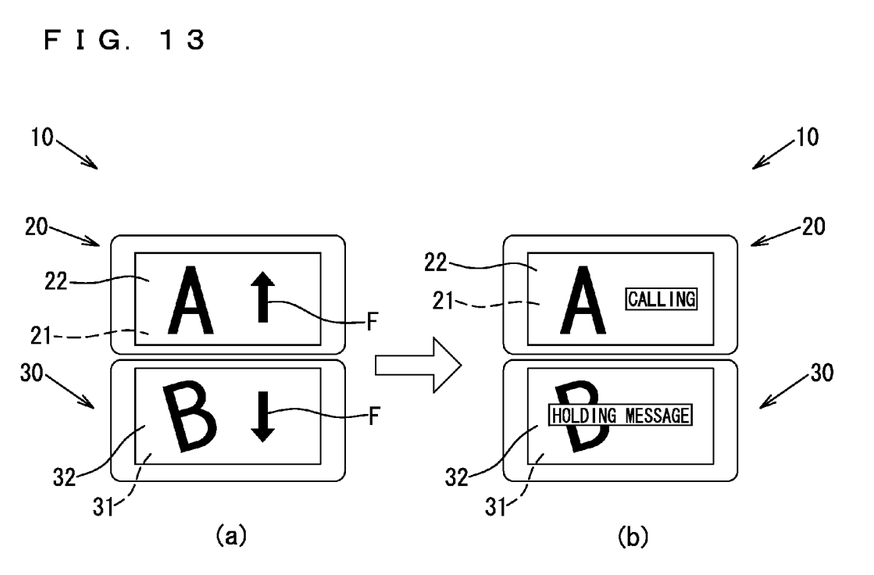
FIG. 13A is an explanation view illustrating a manipulation of the electronic device according to an embodiment of the present invention.
FIG. 13B is an explanation view illustrating an example of an operation corresponding thereto.

| State | Manipulation | Operation of the operating system | Remarks |
|---|---|---|---|
| During activation of two applications at the same time | Moving inwardly on both the touch panels | Closing both the applications and returning to the home | FIG. 4 |
| | Moving inwardly on only one of the touch panels | Returning to the home in one side | FIG. 5 |
| | Moving outwardly on both the touch panels | Locking the screens and coming into sleeping | FIG. 6 |
| | Moving outwardly on only one of the touch panels | Displaying the application in the un-moved side in a full-screen manner | FIG. 7 |
| | Intersecting leftwardly and rightwardly on both the touch panels | Interchanging the upper and lower screens with each other | FIG. 8 |
| | Moving laterally on one of the touch panels | Activating an application having been activated in the past | FIG. 9 |
| | Moving rightwardly on both the touch panels | Turning up the sound volume | FIG. 10 |
| | Moving leftwardly on both the touch panels | Turning down the sound volume | FIG. 10 |
| | Long tapping on both the touch panels | Activating an application list and stopping the system | |
| During activation of an application over the full screen | Moving inwardly on both the touch panels | Closing both the applications and returning to the home | |
| | Moving inwardly on only one of the touch panels | Returning to the home only in the moved side | FIG. 11 |
| | Moving outwardly on both the touch panels | Locking the screens and coming into sleeping | |
| | Moving laterally on one of the touch panels | Activating an application having been activated in the past | |
| | Moving rightwardly on both the touch panels | Turning up the sound volume | |
| | Moving leftwardly on both the touch panels | Turning down the sound volume | |
| | Long tapping on both the touch panels | Activating an application list and stopping the system | |
| During the occurrence of a ring alert | Moving inwardly on both the touch panels | Responding | FIG. 12 |
| | Moving outwardly on both the touch panels | Holding | FIG. 13 |
| | Moving laterally on both the touch panels | Displaying a response list | |

Table 1 represents specific examples of operations of the operating system for respective different cases, which are a case where two applications are being activated at the same time ("during activation of two applications at the same time" in Table 1), a case where a single application is being activated and displayed over both the first display screen 21 and the second display screen 31 ("during activation of an application over the full screen" in Table 1), and a case where a phone is ringing ("during the occurrence of a ring alert" in Table 1).

For example, when two applications are being activated at the same time, if flicking or dragging motions (F)(F) are performed on both the touch panels 22 and 32 in such a way as to inwardly move fingers from their upper and lower opposite sides, as illustrated in Table 1 and FIG. 4A, the executor 72 transmits an operational command to the operating-system control portion 70 to close both the applications being executed and to return to the home, as illustrated in Table 1. Thus, the operating-system control portion 70 executes this command (FIG. 4B).

Further, when two applications are being activated at the same time, in the state where long tapping (L) is being performed on one touch panel 32, if a flicking or dragging motion (F) is performed on the other touch panel 22 in such a way as to inwardly move a finger, as illustrated in Table 1 and FIG. 5A, the executor 72 transmits an operational command to the operating-system control portion 70 to close the application in the side on which the inwardly-moving motion has been performed and to return to the home, as illustrated in Table 1. Thus, the operating-system control portion 70 executes this command (FIG. 5B).

When two applications are being activated at the same time, if flicking or dragging motions (F) (F) are performed on both the touch panels 22 and 32 in such a way as to move fingers upwardly and outwardly, and downwardly and outwardly from their inner sides, contrary to the case of FIG. 4, as illustrated in Table 1 and FIG. 6A, the executor 72 transmits an operational command to the operating-system control portion 70 to lock both the applications being executed and to come into a sleeping state, as illustrated in Table 1. Thus, the operating-system control portion 70 executes this command (FIG. 6B).

When two applications are being activated at the same time, in the state where long tapping (L) is being performed on one touch panel 22, if a flicking or dragging motion (F) is performed on the other touch panel 32 in such a way as to move a finger outwardly, as illustrated in Table 1 and FIG. 7A, the executor 72 transmits an operational command to the operating-system control portion 70 to display the application, which has not been moved outwardly by the finger, on both the first display portion 21 and the second display portion 31 continuously (in a full-screen manner), as illustrated in Table 1. Thus, the operating-system control portion 70 executes this command (FIG. 7B).

When two applications are being activated at the same time, if flicking or dragging motions (F)(F) are performed on both the touch panels 22 and 32 in such a way as to cross fingers each other leftwardly and rightwardly in respective different directions, as illustrated in Table 1 and FIG. 8A, the executor 72 transmits an operational command to the operating-system control portion 70 to interchange the displays of both the applications being executed thereon with each other, as illustrated in Table 1. Thus, the operating-system control portion 70 executes this command (FIG. 8B).

When two applications are being activated at the same time, in the state where long tapping (L) is being performed on one touch panel 32, if a flicking or dragging motion (F) is performed on the other touch panel 22 in such a way as to laterally move a finger toward one side thereof, as illustrated in Table 1 and FIG. 9A, the executor 72 transmits an operational command to the operating-system control portion 70 to activate an application which has been activated in the past, as illustrated in Table 1, in the case where a list of applications which have been activated in the past is additionally managed therein, for example. Thus, the operating-system control portion 70 executes this command (FIG. 9B).

When two applications are being activated at the same time, if flicking or dragging motions (F) (F) or (F') (F') are performed on both the touch panels 22 and 32 in the same direction, out of the leftward and rightward directions, as illustrated in Table 1 and FIG. 10A, the executor 72 transmits an operational command to the operating-system control portion 70 to turn up the sound volume (flicking motions (F) (F) in the rightward direction, for example) or to turn down the sound volume (flicking motions (F') (F') in the leftward direction, for example), as illustrated in Table 1. Thus, the operating-system control portion 70 executes this command (FIG. 10B).

When two applications are being activated at the same time, if long tapping is performed on both the touch panels 22 and 32, as illustrated in Table 1, the executor 72 transmits an operational command to the operating-system control portion 70 to activate a list of applications and to stop the functions of the system. Thus, the operating-system control portion 70 executes this command (not illustrated).

Further, in the state where a single application is being displayed on both the first display portion 21 and the second display portion 31 in a full-screen manner, regardless of the difference in the number of applications being activated in the above mentioned case, it is similarly possible to perform the same manipulations as those described above, as illustrated in Table 1. For example, as illustrated in FIG. 11A, in the state where long tapping (L) is being performed on one touch panel 22, if a flicking or dragging motion (F) is performed on the other touch panel 32 in such a way as to inwardly move a finger, the executor 72 transmits an operational command to the operating-system control portion 70 to return to the home only in the side on which the inwardly-moving motion has been performed, as illustrated in Table 1. Thus, the operating-system control portion 70 executes this command (FIG. 11B).

Regardless of the presence or absence of an activated application, when a phone ring alert is occurring, if flicking or dragging motions (F)(F) are performed on both the touch panels 22 and 32 in such a way as to inwardly move fingers from their upper and lower opposite sides, as illustrated in FIG. 12A, the executor 72 transmits an operational command to the operating-system control portion 70 to respond to the phone and to display a message indicative of the respond, as illustrated in Table 1. Thus, the operating-system control portion 70 executes this command (FIG. 12B).

Further, when a phone ring alert is occurring, if flicking or dragging motions (F)(F) are performed on both the touch panels 22 and 32 in such a way as to move fingers upwardly and outwardly, and downwardly and outwardly from their inner sides, as illustrated in FIG. 13A, the executor 72 transmits an operational command to the operating-system control portion 70 to hold the phone and to display a message indicative of the hold, as illustrated in Table 1. Thus, the operating-system control portion 70 executes this command (FIG. 13B).

In addition thereto, when a ring alert is occurring, as illustrated in FIG. 8A or FIG. 10A, if flicking or dragging motions are performed on both the touch panels 22 and 32 in respective different directions in such a way as to cross fingers leftwardly and rightwardly or in the same direction, it is possible to display a list of responses (see Table 1).

Note that the manipulations of the touch panels 22 and 32, and the corresponding operations of the operating system are merely illustrative, and combinations of manipulations and the corresponding operations of the operating system are not limited to those described above, as a matter of course.

Further, if a manipulation performed on the touch panels 22 and 32 in an application-side overlaps with a manipulation of this application, it is possible to set such that the manipulation of the application can be prioritized.

Figure 14:
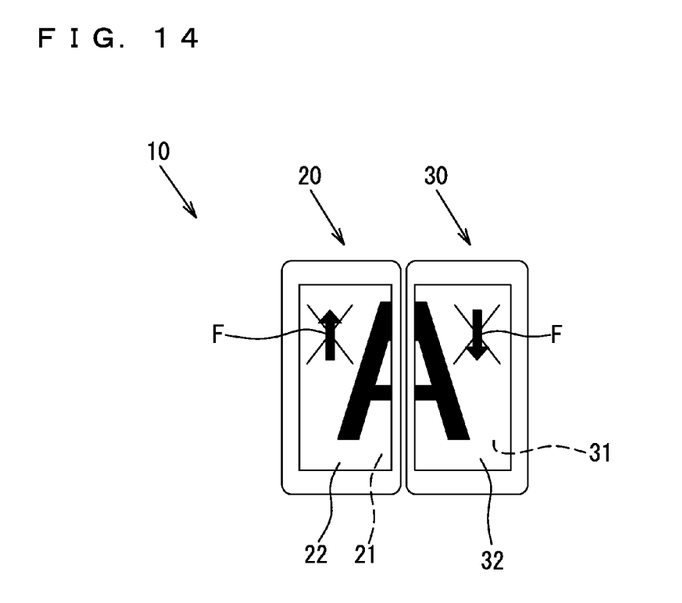
FIG. 14 is an explanation view illustrating an example of an operation of the electronic device according to an embodiment of the present invention, in the case where the device is manipulated in a lateral orientation.

Further, when the electronic device 10 includes the inclination detection sensor 62 such as an acceleration sensor, it is possible to determine whether the attitude of the electronic device 10 is in a longitudinal orientation or a lateral orientation. Further, when the display screens 21 and 31 are arranged in a lateral orientation as illustrated in FIG. 14, for example, even if motions (F) (F) are performed on both the touch panels 22 and 32, it is possible to deactivate the manipulation of the operating system based on these motions.

In addition thereto, when an application intended to be used in a lateral orientation is being activated, even if motions are performed on both the touch panels 22 and 32, it is possible to deactivate the manipulation of the operating system based on the motions.

As described above, it is possible to execute various types of manipulations of the operating system, by performing manipulations of both the touch panels 22 and 32. This can provide the electronic device 10 which is easy to be sensuously manipulated.

The present embodiment is effective in improving the maneuverability of an electronic device including the plurality of display screens and touch panels.

What is claimed is:

1. An electronic device, comprising:
   a plurality of display screens capable of displaying information thereon, wherein each of the plurality of display screens is provided with a touch panel adapted to receive user input; and
   one or more modules that,
      display data for an active application on one of the plurality of display screens, wherein the one display screen is provided with a first touch panel,
      detect a user operation, wherein the user operation comprises at least one user input received by one or more of the touch panels, including a touch input on the first touch panel,
      when the user operation comprises only a touch input on the first touch panel, execute a process of the active application corresponding to the user operation, and,
      when the user operation comprises a touch input on the first touch panel at substantially the same time as a touch input on a second touch panel which is different than the first touch panel, execute a process of the operating system corresponding to the user operation.

2. The electronic device according to claim 1, wherein one or both of the touch input on the first touch panel and the touch input on the second touch panel comprise a motion.

3. The electronic device according to claim 2, wherein the motion comprises a flick or a drag.

4. The electronic device according to claim 2, wherein the motion comprises a touch followed by a sweeping motion.

5. The electronic device according to claim 1, wherein the one or more modules, when the user operation comprises a touch input on the first touch panel at substantially the same time as a touch input on the second touch panel, determine the process of the operating system corresponding to the user operation based on a number of applications currently active on the electronic device, and wherein executing the process of the operating system comprises executing the determined process.

6. A method for controlling an electronic device comprising a plurality of display screens, wherein each of the plurality of display screens is provided with a touch panel adapted to receive user input, the method comprising:
   displaying data for an active application on one of the plurality of display screens, wherein the one display screen is provided with a first touch panel,
   detecting a user operation, wherein the user operation comprises at least one user input received by one or more of the touch panels, including a touch input on the first touch panel;
   when the user operation comprises only a touch input on the first touch panel, executing a process of the active application corresponding to the user operation, and,
   when the user operation comprises a touch input on the first touch panel at substantially the same time as a touch input on a second touch panel which is different than the first touch panel, executing a process of the operating system corresponding to the user operation.

* * * * *